UNITED STATES PATENT OFFICE.

FREDERIC J. SMITH, OF ELIZABETH, NEW JERSEY, ASSIGNOR TO WILLIAM H. BOWKER, OF BOSTON, MASSACHUSETTS.

BORDEAUX MIXTURE AND METHOD OF MAKING SAME.

SPECIFICATION forming part of Letters Patent No. 718,537, dated January 13, 1903.

Application filed June 5, 1901. Serial No. 63,307. (No specimens.)

*To all whom it may concern:*

Be it known that I, FREDERIC J. SMITH, a citizen of the United States, residing at Elizabeth, in the county of Union and State of New Jersey, have invented certain new and useful Improvements in Bordeaux Mixture and Method of Preparing the Same, of which the following is a specification.

My invention relates to improvements in the process of preparing the "Bordeaux mixture," so called, and in the product thereby obtained, all of which will be hereinafter more fully described.

When blue vitriol and ordinary dry slaked lime are mixed in a dry state and water is subsequently added, the copper hydroxid so produced is of poor mechanical condition and incapable of proper distribution by spraying, which is the preferred method of application.

I have discovered that if milk or cream of lime be first combined with a weak acid having little or no affinity for copper hydroxid and if the lime so treated be then dried and mixed with blue vitriol, also dry, when water is added to the mixture a copper hydroxid is produced which is free from the mechanical defects above noted.

In carrying out my invention I take milk or cream of lime and mix it with a weak acid, preferably those acids existing in the commercial product known as "resin-oil," thereby forming a lime soap. The soap is then dried and powdered and mixed with ordinary granulated blue vitriol of commerce, preferably in about equal parts. This mixture can be readily packed, preserved, handled, and transported and can be prepared for application as an insecticide for spraying by the addition of water.

The mixture is preferably prepared in the following manner and with the following proportions of ingredients: To prepare the lime soap, twenty pounds of ordinary stone-lime of good quality is slaked with boiling water in the ordinary way, and after the violent reaction which accompanies the water slaking of lime has ceased sufficient water is added to make a thin cream, commonly known as "cream of lime." To this is added one gallon of second-run rosin-oil and the whole thoroughly mixed, when it will be found that much water has separated by the reaction between the lime and rosin-oil. The excess of water is drained off, or it may be filtered off in a suitable manner and the lime-resin compound dried at a temperature not exceeding 212° Fahrenheit, which drying is best accomplished by placing the material in shallow pans over steam-pipes. The resulting product will be a friable compound easily pulverized into a floury mass and can be readily passed through a suitable screen, preferably a No. 40 mesh, which will reject all lumps unsuited for the Bordeaux mixture. One part, by weight, of comminuted blue vitriol of commerce is added to one part, by weight, of the lime soap. This is easily changed to Bordeaux mixture by adding sixteen to twenty parts of cold water to one part of the above-mixed lime soap and blue vitriol. After a thorough stirring and a complete solution of the blue vitriol the mixture is ready for spraying.

Having described my invention, what I claim as new, and desire to secure by Letters Patent, is—

1. The improvement in the art of preparing Bordeaux mixture which consists in mixing milk or cream of lime with rosin-oil, as described, drying the same and mixing the resultant powder with blue vitriol.

2. The improved product herein described consisting of a mixture of lime soap and blue vitriol.

3. The improved product herein described consisting of a mixture of milk or cream of lime combined with rosin-oil and blue vitriol.

4. The improved product herein described consisting of lime, rosin-oil and blue vitriol.

In testimony whereof I have hereunto subscribed my name this 14th day of May, 1901.

FREDERIC J. SMITH.

Witnesses:
HENRY J. MILLER,
HANNAH N. F. MILLER.